US011202178B2

United States Patent
Huang et al.

(10) Patent No.: US 11,202,178 B2
(45) Date of Patent: Dec. 14, 2021

(54) TECHNIQUES FOR MACHINE-TO-MACHINE DEVICE MANAGEMENT

(75) Inventors: Rui Huang, Beijing (CN); Honggang Li, Beijing (CN); Shantidev Mohanty, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/976,466

(22) PCT Filed: Sep. 28, 2011

(86) PCT No.: PCT/US2011/053698
§ 371 (c)(1),
(2), (4) Date: Jun. 26, 2013

(87) PCT Pub. No.: WO2012/154198
PCT Pub. Date: Nov. 15, 2012

(65) Prior Publication Data
US 2013/0265932 A1  Oct. 10, 2013

Related U.S. Application Data

(60) Provisional application No. 61/484,105, filed on May 9, 2011.

(51) Int. Cl.
*H04W 4/08* (2009.01)
*H04W 8/18* (2009.01)
(Continued)

(52) U.S. Cl.
CPC ............. *H04W 4/08* (2013.01); *H04W 8/186* (2013.01); *H04W 60/00* (2013.01); *H04W 76/19* (2018.02); *H04W 76/40* (2018.02)

(58) Field of Classification Search
CPC ..... H04W 4/08; H04W 76/002; H04W 8/186; H04W 76/028; H04W 60/00; H04W 76/19; H04W 76/40
(Continued)

(56) References Cited

U.S. PATENT DOCUMENTS 6,614,787 B1  9/2003  Jain et al.
7,149,215 B1  12/2006  He
(Continued)

FOREIGN PATENT DOCUMENTS

CN    101902756    12/2010
JP    2003018306    6/2001
(Continued)

OTHER PUBLICATIONS

Cho (IEEE 802.16p-10/0005 [Machine to Machine (M2M) Communications Technical Report]), Nov. 11, 2010, IEEE, whole document.*
(Continued)

*Primary Examiner* — Un C Cho
*Assistant Examiner* — Jose L Perez
(74) *Attorney, Agent, or Firm* — Eschweiler & Potashnik, LLC

(57) ABSTRACT

Techniques for machine-to-machine device management are described. In some embodiments a method may comprise receiving information from a plurality of machine-to-machine (M2M) devices over one or more wireless channels, aggregating two or more of the M2M devices as an M2M group based on the received information, and multicasting data to the M2M devices in the M2M group over the one or more wireless channels. Other embodiments are described and claimed.

13 Claims, 8 Drawing Sheets

(51) Int. Cl.
    *H04W 60/00*         (2009.01)
    *H04W 76/19*         (2018.01)
    *H04W 76/40*         (2018.01)

(58) Field of Classification Search
    USPC .............................. 370/312, 328; 455/435.1
    See application file for complete search history.

(56) References Cited

U.S. PATENT DOCUMENTS

| | | | |
|---|---|---|---|
| 8,437,782 B2 | 5/2013 | Bergqvist et al. | |
| 8,942,170 B1* | 1/2015 | Fang ........................ | H04W 4/70 370/328 |
| 2005/0076369 A1* | 4/2005 | Cai ........................ | H04L 12/185 725/62 |
| 2005/0124344 A1* | 6/2005 | Laroia et al. .................. | 455/436 |
| 2006/0098613 A1* | 5/2006 | Kish ..................... | H04W 72/005 370/338 |
| 2007/0206561 A1* | 9/2007 | Son ..................... | H04W 72/042 370/346 |
| 2008/0062923 A1* | 3/2008 | Ponnuswamy ............... | 370/331 |
| 2009/0191857 A1* | 7/2009 | Horn ..................... | H04L 9/0891 455/419 |
| 2011/0053619 A1* | 3/2011 | Shaheen .................. | H04W 4/00 455/466 |
| 2011/0128911 A1* | 6/2011 | Shaheen ............... | H04L 63/104 370/328 |
| 2011/0149859 A1* | 6/2011 | Sung ..................... | H04W 76/15 370/328 |
| 2011/0199905 A1* | 8/2011 | Pinheiro ............... | H04W 4/005 370/235 |
| 2011/0201344 A1* | 8/2011 | Ryu ........................ | H04W 4/70 455/450 |
| 2011/0201365 A1* | 8/2011 | Segura ..................... | H04W 4/70 455/466 |
| 2011/0274040 A1* | 11/2011 | Pani ..................... | H04W 74/006 370/328 |
| 2012/0004003 A1* | 1/2012 | Shaheen .................. | H04W 4/08 455/509 |
| 2012/0014287 A1* | 1/2012 | Kim ........................ | H04W 4/08 370/254 |
| 2012/0020271 A1* | 1/2012 | Josiam .................. | H04L 5/0098 370/312 |
| 2012/0040700 A1* | 2/2012 | Gomes .................... | H04W 4/08 455/500 |
| 2012/0106431 A1 | 5/2012 | Wu et al. | |
| 2012/0163160 A1* | 6/2012 | Himayat et al. .............. | 370/216 |
| 2012/0196608 A1* | 8/2012 | Ting .................... | H04W 74/085 455/450 |
| 2012/0231828 A1* | 9/2012 | Wang ...................... | H04W 4/70 455/509 |
| 2012/0282925 A1* | 11/2012 | Wehmeier ............. | H04W 68/02 455/434 |
| 2013/0007231 A1* | 1/2013 | Forssell ................ | H04L 41/082 709/221 |
| 2013/0040680 A1* | 2/2013 | Kim ........................ | H04W 4/70 455/509 |
| 2013/0051326 A1* | 2/2013 | Jeyatharan ............ | H04L 47/824 370/328 |
| 2013/0163495 A1* | 6/2013 | Lim .................... | H04W 72/121 370/311 |
| 2013/0225130 A1* | 8/2013 | Rost ........................ | H04W 4/70 455/411 |
| 2013/0252643 A1* | 9/2013 | Park .................. | H04W 52/0219 455/458 |
| 2013/0260801 A1* | 10/2013 | Kim ........................ | H04W 4/70 455/458 |
| 2014/0023053 A1* | 1/2014 | Park .................... | H04W 72/042 370/336 |

FOREIGN PATENT DOCUMENTS

| | | | | |
|---|---|---|---|---|
| WO | WO 2011028038 A2 * | 3/2011 | ........ | H04W 72/0406 |
| WO | WO-2011028038 A2 * | 3/2011 | ........ | H04W 72/0406 |
| WO | 2011-043571 A2 | 4/2011 | | |
| WO | WO 2011098128 A1 * | 8/2011 | | |
| WO | WO-2012020988 A2 * | 2/2012 | ............. | H04L 5/001 |
| WO | WO-2012041363 A1 * | 4/2012 | ............. | H04W 4/70 |
| WO | WO 2012074337 A2 * | 6/2012 | ............. | H04W 4/005 |
| WO | WO-2012074337 A2 * | 6/2012 | ............. | H04W 68/02 |

OTHER PUBLICATIONS

Wikipedia entry (Network packet), downloaded from web.archive. org/web/20110403055839/http://en.wikipedia.org/wiki/Network_packet, Apr. 3, 2011, whole document.*

Cha (IEEE 802.16p-11/0019, "Device ID and Group ID for M2M Devices"), Mar. 6, 2011, IEEE, pp. 1-2, retrieved from www.ieee802. org/16/m2m/contrib/C80216p-11_0019.doc.*

Yanover (IEEE 802.16.3-01/15, "MAC Headers Structure for 802. 16 MAC"), Jan. 17, 2001, IEEE, p. 4, retrieved from www.ieee802. org/16/tg3/contrib/802163c-01_15.pdf.*

Huang et al., IEEE C802.16p-11/0104, "M2M Group ID Addressing Scheme in IEEE802.16m System", IEEE 802.16 Broadband Wireless Access Working Group, May 8, 2011, whole document.*

Nuaymi, "WiMAX: Technology for Broadband Wireless Access", Mar. 23, 2007, John Wiley & Sons, pp. 171-173.*

Lee et al., IEEE 802.16p-10/0004r2, "IEEE 802.16p Machine to Machine (M2M) System Requirements Document (SRD) (initial working document revised)", IEEE 802.16 Broadband Wireless Access Working Group, Jan. 13, 2011, whole document.*

Shim et al., IEEE C802.16m-10/0761r1, "Proposed text for carrier switching mode for E-MBS (16.9)", IEEE 802.16 Broadband Wireless Access Working Group, Jul. 11, 2010, whole document.*

IEEE, IEEE Approves IEEE 802.16m Advanced Mobile Broadband Wireless Standard, Mar. 17, 2011, IEEE (downloaded from www. ieee802.org/16/docs/11/80216-11_0013.doc), whole document.*

Kim et al., U.S. Appl. No. 61/419,718, Multicast Data Transmission Method and Heirarchical Group Structure for M2M System, (provisional document of WO 2012/074337 A2), filed Dec. 3, 2010, whole document.*

Kim et al., U.S. Appl. No. 61/422,221, Efficient Multicast Data Transmission Method for M2M Service, (provisional document of WO 2012/074337 A2), filed Dec. 13, 2010, whole document.*

Kim et al., U.S. Appl. No. 61/440,348, Multicast Transmission for M2M System, (provisional document of WO 2012/074337 A2), filed Feb. 7, 2011, whole document.*

Josiam et al., U.S. Appl. No. 61/410,287, Method and Apparatus To Enable Switching Between Two Carriers in a Cellular Communication Network, (provisional document of WO 2012/020988 A2), filed Nov. 4, 2010, whole document (Year: 2010).*

Cha (IEEE 802.16p-11/0019, "Device ID and Group ID for M2M Devices"), Mar. 6, 2011, IEEE, pp. 1-2, retrieved from www.ieee802. org/16/m2m/contrib/C80216p-11_0019.doc (Year: 2011).*

Cha (IEEE 802.16p-11/0019, "Device ID and Group ID for M2M Devices"), Mar. 6, 2011, IEEE, whole document, retrieved from www.ieee802.org/16/m2m/index.html (Year: 2011).*

Kim et al. (IEEE C802.16p-11/0086, "Proposed text of MGID reassignment procedure in IEEE 802.16p system"), May 9, 2011, IEEE, whole document, retrieved from www.ieee802.org/16/m2m/index.html (Year: 2011).*

Li et al., (C802.16p-11/0013, "Group-based M2M solutions"), Mar. 3, 2010, IEEE, whole document, retrieved from www.ieee802.org/16/m2m/index.html (Year: 2011).*

Chou et al., (C802.16p-11/0062, "M2M traffic characteristics"), May 7, 2011, IEEE, whole document, retrieved from www.ieee802. org/16/m2m/index.html (Year: 2011).*

Kim et al., (C802.16p-10/0019, "Group based ID allocation for M2M system"), IEEE, whole document, retrieved from www.ieee802. org/16/m2m/index.html (Year: 2011).*

Huang et al., M2M Group ID Assignment Scheme in IEEE802.16e System; C80216p-11_0153, IEEE 802.16 Broadband Wireless Access Working Group, Jul. 10, 2011, whole document (Year: 2011).*

(56) References Cited

OTHER PUBLICATIONS

Chou et al., Optimization of UL grant scheduling for M2M, C802.16p-11/017r2, IEEE 802.16 Broadband Wireless Access Working Group, Mar. 16, 2011, whole document (Year: 2011).*
Kim et al., U.S. Appl. No. 61/440,348, Multicast Transmission for M2M System, (provisional document of US 2013/0260801 A1), filed Feb. 7, 2011, whole document (Year: 2011).*
IEEE Computer Society, IEEE Std 802.16™—2009, May 29, 2009, p. 120 (Year: 2009).*
IEEE Computer Society, IEEE Std 802.16m™—2011, May 6, 2011, p. 231 (Year: 2011).*
Cha et al., Device ID and Group ID for M2M Devices, C80216p-11 0019, IEEE 802.16 Broadband Wireless Access Working Group, Mar. 6, 2011, whole document (Year: 2011).*
Park et al., Station Grouping Based On Primary Setup Information, U.S. Appl. No. 61/480,380, filed Apr. 29, 2011, whole document (Year: 2011).*
International Search Report and Written Opinion, dated Apr. 18, 2012, Application No. PCT/US2011/053698, Filed Date: Sep. 28, 2011, p. 9.
Office Action received for Japanese patent Application No. 2014-510295, dated Oct. 21, 2014, 4 pages including 2 pages English translation.
"A method to trigger detached devices using broadcast channel", 3GPP TSG SA WG2 Meeting #83 TD S2-110672, 3GPP, Feb. 25, 2011, <http://www.3gpp.org/ftp/tsg_sa/WG2_Arch/TSGS2_83_Salt_Lake_City/Docs/S2-110672, 3 pages, (Author unknown).
"IEEE 802.16p Machine to Machine (M2M) System Requirements Document (SRD)" (initial working document revised), IEEE 802.16p-10/0004r2, IEEE, Jan. 13, 2011, <http://ieee802.org>, 8 pages, (Author unknown).
Extended European Search Report received for European patent Application No. 11864973.0, dated Apr. 10, 2015, 8 pages.
Huang et al., "M2M Group ID Addressing Scheme in IEEE802.16m System", IEEE 802.16 Broadband Wireless Access Working Group, <http://ieee802.org>, May 8, 2011, 7 pages.
Wu et al., "M2M: From Mobile to Embedded Internet", Recent Progress in Machine-to-Machine Communications, IEEE Communications Magazine, Apr. 2011, 8 pages.
Honggang et al.,"Relaying for M2M", IEEE 802.16 Broadband Wireless Access Working Group, <http://ieee802.org>, May 8, 2011, 4 pages.
Office Action and Search Report received for Chinese Patent Application No. 201180070766.1, dated Aug. 2, 2016, 6 pages (untranslated).
Rui Huang et al: "M2M Group ID Addressing Scheme in IEEE802.16m System; C80216p-11 0104r2", IEEE Draft; C80216P-11 0104R2, IEEE-SA, Piscataway, NJ USA,—vol. 802. 16p, No. r2, May 8, 2011 (May 8, 2011), pp. 1-7.
Geng Wu et al: "M2M: From mobile to embedded internet", IEEE Communications Magazine, IEEE Service Center, Piscataway, US, vol. 49, No. 4, Apr. 1, 2011 (Apr. 1, 2011), pp. 36-43.
Honggang Li et al: "Relaying for M2M; C80216p-11 0087", IEEE Draft; C80216P-11 0087, IEEE-SA, Piscataway, NJ USA,—vol. 802.16p, May 8, 2011 (May 8, 2011), pp. 1-4.
Extended European Search Report for European Application No. 11864973, dated Apr. 10, 2015, 1 page.
Kaushik et al. IEEE 802. 16p Machine to Machine (M2M): Proposed Text from Large number of devices (DEV) Rapporteur Group (Mar. 17, 2011), pp. 1-7.
Service requirements for machine-type communications; Stage 1 (Release 10).

* cited by examiner

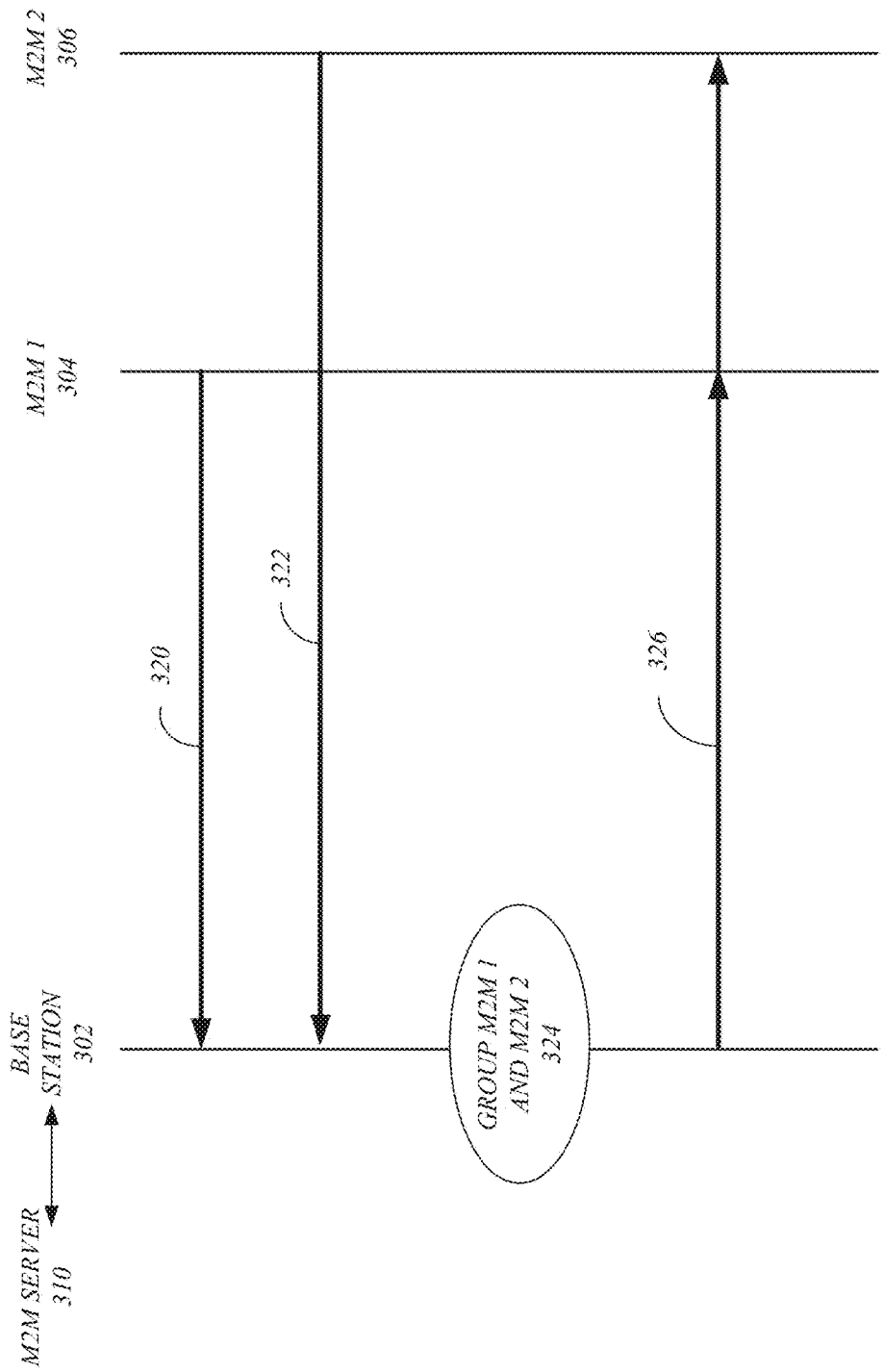

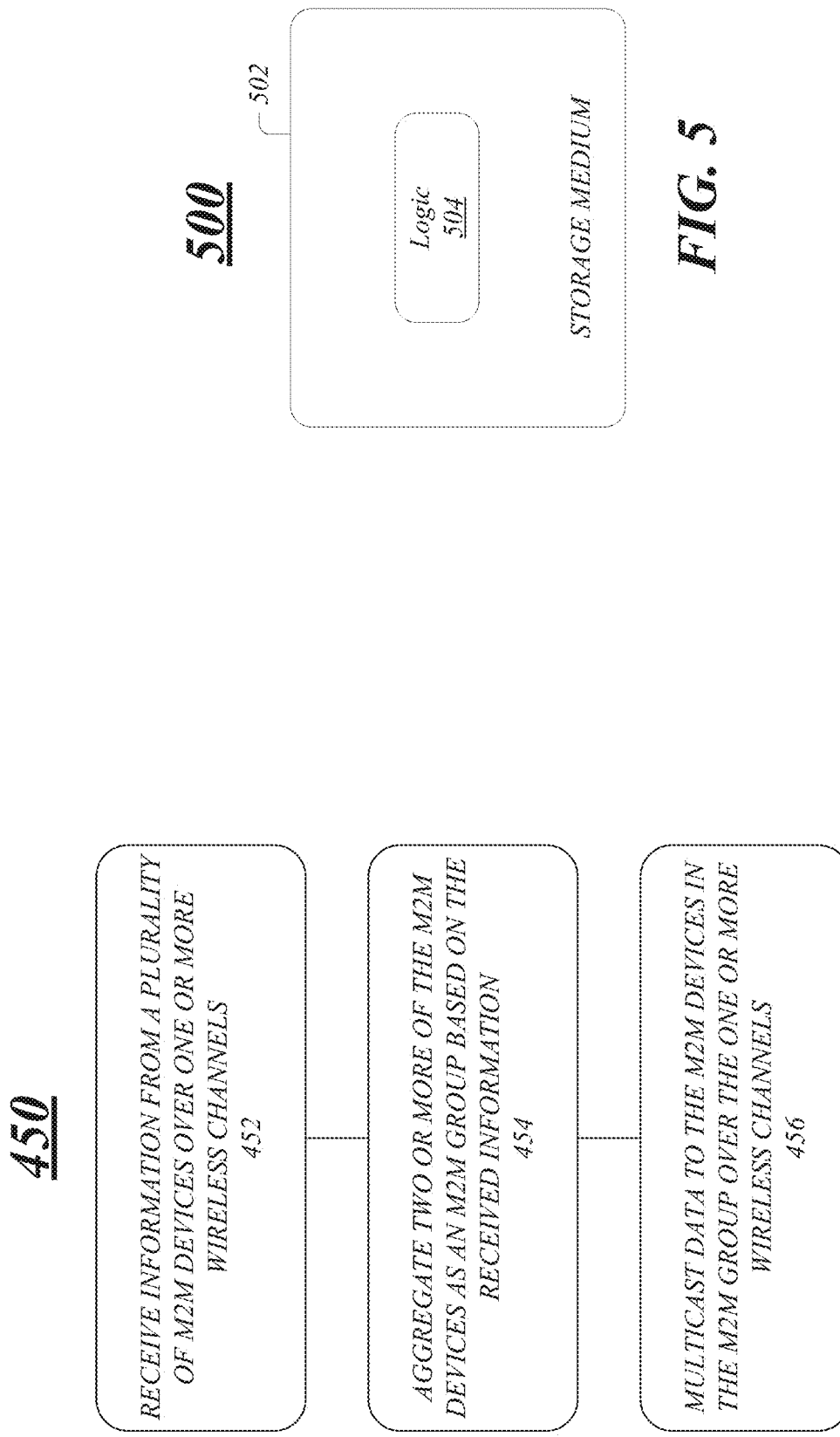

TECHNIQUES FOR MACHINE-TO-MACHINE DEVICE MANAGEMENT

RELATED APPLICATIONS

This application claims priority to U.S. Provisional Patent Application Ser. No. 61/484,105 filed May 9, 2011, which is incorporated herein by reference in its entirety.

BACKGROUND

Wireless communication systems communicate information over a shared wireless communication medium such as one or more portions of the radio-frequency (RF) spectrum. Recent innovations in mobile computing devices and the increased availability of advanced, interactive, multimedia and other data services have resulted in increased demands placed on wireless communications systems. Furthermore, the limited bandwidth of wireless communications systems and the cost of transmission of data, among other factors, are important considerations when implementing wireless communications systems. One particular area that results in increased demands on a wireless communications system is a large number of devices communicating in the system. In a machine-to-machine network, for example, a large number of machine-to-machine devices may be in the domain of a machine-to-machine base station, resulting in a large amount of communications overhead. As the number and type of devices continues to increase, the demands placed on wireless communications systems, such as increased overhead associated with each device, continue to increase. Consequently, techniques designed to manage machine-to-machine devices in a wireless communications system are desirable.

BRIEF DESCRIPTION OF THE DRAWINGS

FIG. 3A illustrates one embodiment of a first transmission diagram.

FIG. 4B illustrates one embodiment of a second logic flow.

FIG. 5 illustrates one embodiment of an article of manufacture.

DETAILED DESCRIPTION

Various embodiments may be generally directed to techniques to manage machine-to-machine (M2M) devices in a wireless communications system. Some embodiments may be particularly directed to methods for grouping or aggregating M2M devices, for example. In one embodiment, information may be received from a plurality of M2M devices over one or more wireless channels, two or more of the M2M devices may be aggregated as an M2M group based on the received information, and data may be multicast to the M2M devices in the M2M group over the one or more wireless channels. Other embodiments are described and claimed.

M2M communications refers, in some embodiments, to technologies that allow both wireless and wired systems to communicate with other devices having the same or similar abilities. In some M2M systems, a device such as a sensor or meter may be arranged to capture an event such as a temperature, inventory level, or other suitable parameter that is relayed through a network to an application that is operative to translate the captured event into meaningful information. M2M networks may allow for any number of implementations, business opportunities and connections.

M2M communications is a capability that enables the implementation of an "Internet of things." In some embodiments, M2M communications may be defined by an information exchange between a subscriber station and a server in a core network through a base station or a connection between subscriber stations. In various embodiments, the communications in an M2M system may occur without human interaction.

The expansion of wireless networks across the world has made it far easier for M2M communication to take place and has lessened the amount of power and time necessary for information to be communicated between machines and devices. As a result, M2M systems are being deployed in wireless networks such as one or more networks arranged to operate in accordance with one or more of the IEEE 802.11 or 802.16 standards.

M2M systems deployed in a wireless network are designed to support a large number of M2M devices and mechanisms for low power consumption. As a result, theses systems often include a large number of M2M devices in the domain of an M2M base station. This large number of M2M devices leads to a large amount of interactions between the M2M devices and the M2M base station, resulting in a large amount of overhead for the wireless communication system. In various embodiments, this may result in increased network usage and congestion. It may be advantageous, therefore, to avoid communicating with each of the plurality of M2M devices individually when possible. Consequently, techniques for grouping M2M devices in a M2M wireless communication system are described.

Figure 1:
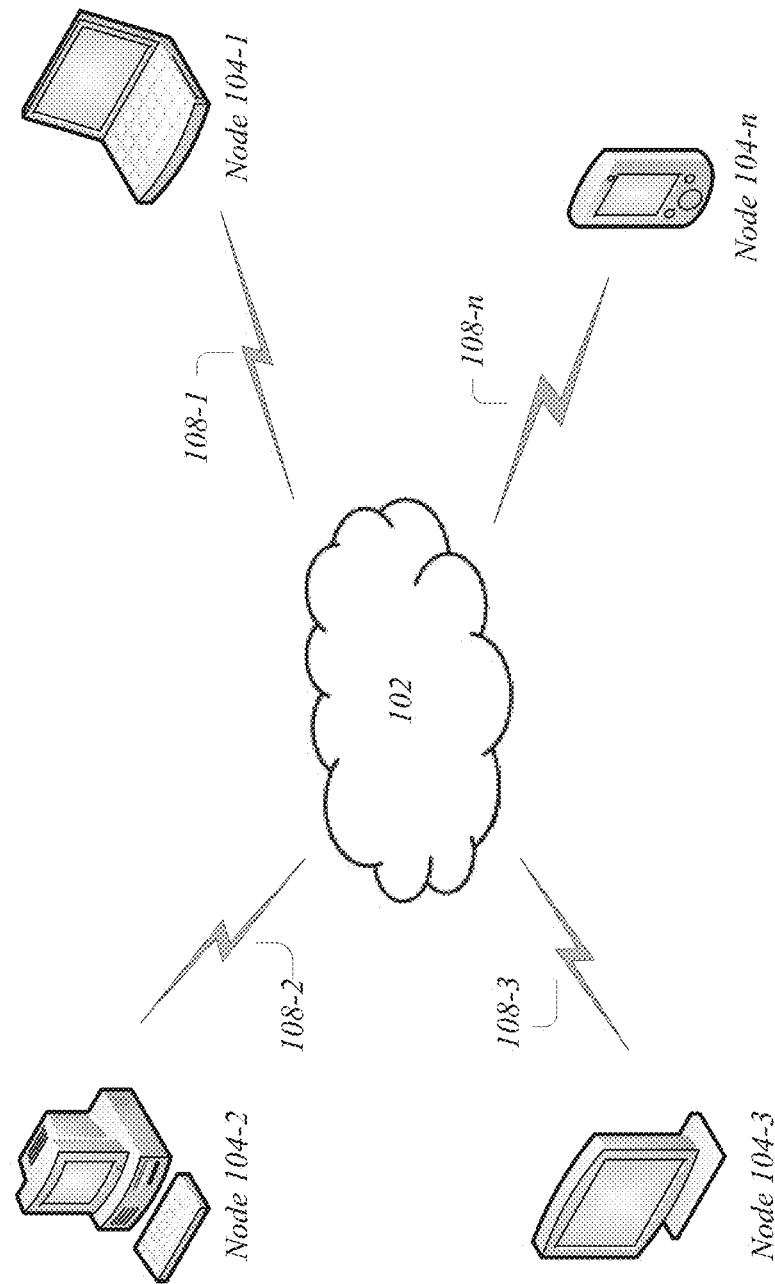
FIG. 1 illustrates one embodiment of a communications system.

FIG. 1 illustrates a block diagram of one embodiment of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The communications system 100 may communicate information in accordance with one or more standards as promulgated by a standards organization. In one embodiment, for example, various devices comprising part of the communications system 100 may be arranged to operate in accordance with one or more of the IEEE 802.16 standards for WMAN including standards such as 802.16-2004, 802.16.2-2004, 802.16e-2005, 802.16f, 802.16m, 802.16p progeny and variants; WGA (WiGig) progeny and variants or a 3GPP Long-Term Evolution (LTE) standard. In some embodiments, the communications system 100 may be arranged to communicate in accordance with any fourth generation (4G) network or radio technology progeny and variants.

In various embodiments, the communications system 100 may be arranged to operate in accordance with one or more of the IEEE 802.11 standard, the WiGig Alliance™ specifications, WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"), or with any other wireless standards as promulgated by other standards organizations such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the communications system 100 may communicate information according to one or more IEEE 802.11 standards for wireless local area networks (WLANs) such as the information IEEE 802.11 standard (1999 Edition, Information Technology Telecommunications and Information Exchange Between Systems—Local and Metropolitan Area Networks—Specific Requirements, Part 11: WLAN Medium Access Control (MAC) and Physical (PHY) Layer Specifications), its progeny and supplements thereto (e.g., 802.11a, b, g/h, j, n, VHT SG, and variants); IEEE 802.15.3 and variants; European Computer Manufacturers Association (ECMA) TG20 progeny and variants; and other wireless networking standards. The embodiments are not limited in this context.

The communications system 100 may communicate, manage, or process information in accordance with one or more protocols. A protocol may comprise a set of predefined rules or instructions for managing communication among nodes. In various embodiments, for example, the communications system 100 may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

As shown in FIG. 1, the communications system 100 may comprise a network 102 and a plurality of nodes 104-1-$n$, where n may represent any positive integer value. In various embodiments, the nodes 104-1-$n$ may be implemented as various types of wireless devices. Examples of wireless devices may include, without limitation, a station, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, sensor, meter and so forth.

In some embodiments, the nodes 104-1-$n$ may comprise one more wireless interfaces and/or components for wireless communication such as one or more transmitters, receivers, transceivers, radios, chipsets, amplifiers, filters, control logic, network interface cards (NICs), antennas, antenna arrays, modules and so forth. Examples of an antenna may include, without limitation, an internal antenna, an omni-directional antenna, a monopole antenna, a dipole antenna, an end fed antenna, a circularly polarized antenna, a microstrip antenna, a diversity antenna, a dual antenna, an antenna array, and so forth.

In various embodiments, the nodes 104-1-$n$ may comprise or form part of a wireless network 102. In one embodiment, for example, the wireless network 102 may comprise a Worldwide Interoperability for Microwave Access (WiMAX) network. Although some embodiments may be described with the wireless network 102 implemented as a WiMAX wireless network for purposes of illustration, and not limitation, it can be appreciated that the embodiments are not limited in this context. For example, the wireless network 102 may comprise or be implemented as various types of wireless networks and associated protocols suitable for a Wireless Personal Area Network (WPAN), a Wireless Local Area Network (WLAN), a Wireless Metropolitan Area Network, a Wireless Wide Area Network (WWAN), a Broadband Wireless Access (BWA) network, a radio network, a cellular network, a television network, a satellite network such as a direct broadcast satellite (DBS) network, and/or any other wireless communications network configured to operate in accordance with the described embodiments. Other embodiments are described and claimed.

Figure 2:
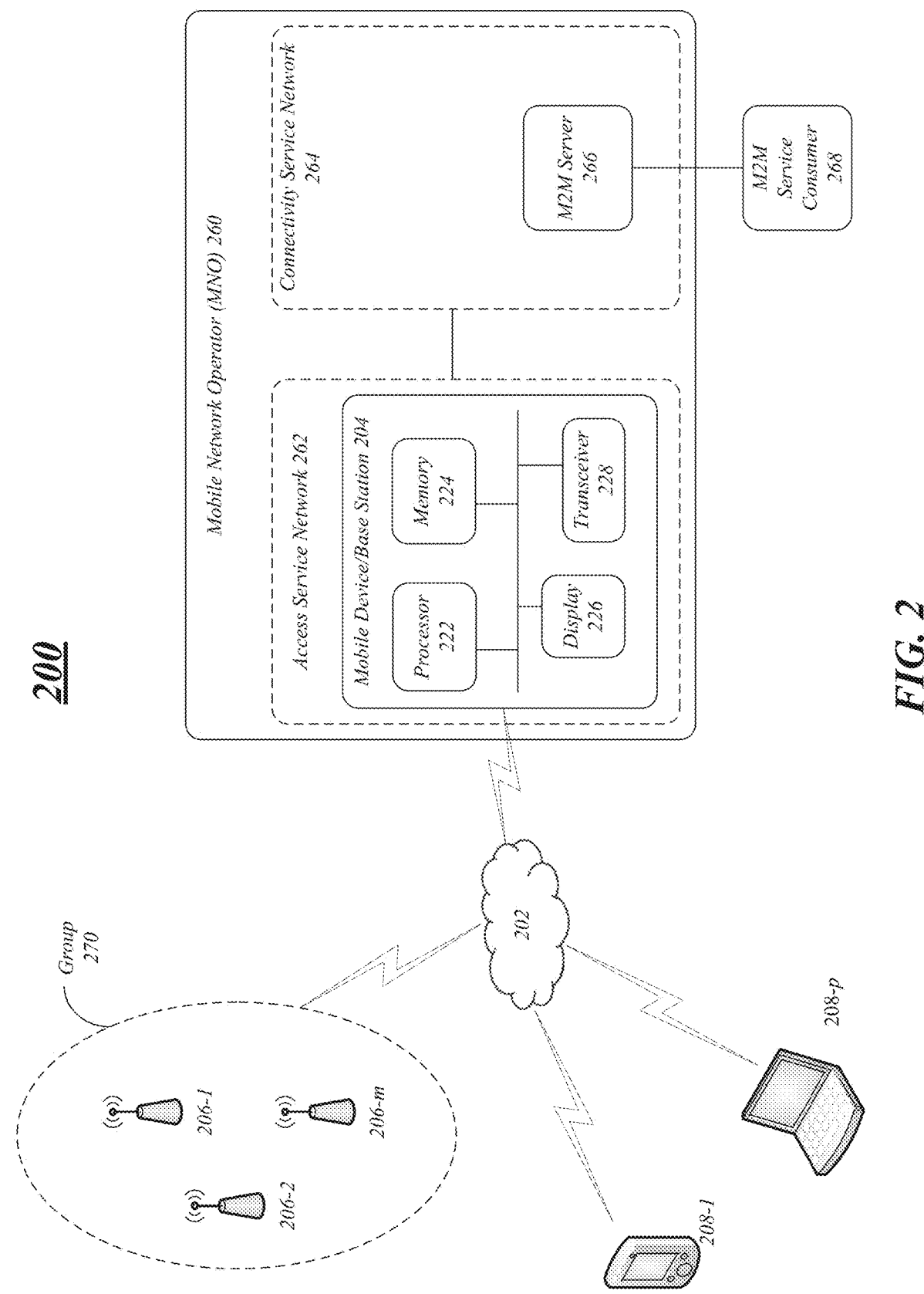
FIG. 2 illustrates one embodiment of a first apparatus.

FIG. 2 illustrates a first apparatus 200. As shown in FIG. 2, the first apparatus 200, which may comprise a wireless communications system similar to that described with reference to FIG. 1, may include nodes 206-1-$m$, 208-1-$p$, 204, 266 and 268 and wireless network 202. Wireless network 202 may comprise the same or a similar network to wireless network 102 described in FIG. 1. Nodes 206-1-$m$, 208-1-$p$, 204, 266 and 268 may comprise mobile computing device similar to nodes 104-1-$n$ described in FIG. 1. As shown in FIG. 2, mobile computing device 204 and network 202 including access service network 262 and connectivity service network 264 have been expanded to show additional details. It should be understood that any suitable device or network may contain the same or similar functionality and still fall within the described embodiments. Furthermore, while a limited number of mobile computing devices, nodes, wireless networks and modules are shown in FIG. 2 for purpose of illustration, it should be understood that the embodiments are not limited to the number or type of elements or modules shown in FIG. 2. Other embodiments are described and claimed.

In some embodiments, the system of FIG. 2 may include mobile network operator (MNO) 260 that includes access service network 262 and connectivity service network 264. MNO 260 may comprise any network operator, carrier service provider (CSP), wireless service provider, wireless carrier, or cellular company, that provides services for mobile device subscribers using one or more portions of a radio spectrum. The access service network 262 and connectivity service network 262 may comprise, in some embodiments, portions or components of the MNO 260. While shown as being separate from network 202 in FIG. 2, in various embodiments MNO 260, access service network 262 and/or connectivity service network 262 may comprise or form part of network 202 and still fall within the described embodiments.

In various embodiments, mobile computing device 204 may include a processor 222, a memory 224, a display 226, and one or more radios or transceivers 228. While not shown, mobile device 204 may also include an antenna array communicatively coupled to transceivers 228 in some embodiments. Mobile computing device 204 may be in wireless communication with one or more of mobile computing devices 206-1-m, 208-1-p, 204, 266 and 268 using wireless network 202. For purposes of illustration, system 200 will be described hereinafter as a WiMAX system where mobile computing device 204 comprises a base station, computing devices 208-1-p comprise non-M2M devices, and computing devices 206-1-m comprise M2M devices. The embodiments are not limited in this context.

As shown, mobile computing device 204 may comprise a processor 222. The processor 222 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 222 may be implemented as a general purpose processor, such as a processor made by Intel® Corporation, Santa Clara, Calif. The processor 222 may also be implemented as a dedicated processor, such as a controller, microcontroller, embedded processor, a digital signal processor (DSP), a network processor, a media processor, an input/output (I/O) processor, and so forth. The processor 222 may have any number of processor cores, including one, two, four, eight or any other suitable number. The embodiments are not limited in this context.

The mobile computing device 204 may comprise a memory 224 in some embodiments. The memory 224 may comprise any machine-readable or computer-readable media capable of storing data, including both volatile and non-volatile memory. For example, the memory 224 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory 224 may be included on the same integrated circuit as the processor 222, or alternatively some portion or all of the memory 224 may be disposed on an integrated circuit or other medium, for example a hard disk drive, that is external to the integrated circuit of the processor 222. The embodiments are not limited in this context.

As further shown in FIG. 2, mobile device 204 may comprise a display 226. Display 226 may comprise any suitable display unit for displaying information appropriate for a mobile computing device. In addition, display 226 may be implemented as an additional I/O device, such as a touch screen, touch panel, touch screen panel, and so forth. Touch screens may comprise display overlays which are implemented using one of several different techniques, such as pressure-sensitive (resistive) techniques, electrically-sensitive (capacitive) techniques, acoustically-sensitive (surface acoustic wave) techniques, photo-sensitive (infra-red) techniques, and so forth. The effect of such overlays may allow a display to be used as an input device, to remove or enhance the keyboard and/or the mouse as the primary input device for interacting with content provided on display 226.

In one embodiment, for example, display 226 may be implemented by a liquid crystal display (LCD) or other type of suitable visual interface. Display 226 may comprise, for example, a touch-sensitive color display screen. In various implementations, the display 226 may comprise one or more thin-film transistors (TFT) LCD including embedded transistors. In such implementations, the display 226 may comprise a transistor for each pixel to implement an active matrix. While the embodiments are not limited in this context, an active matrix display may be desirable since it requires lower current to trigger pixel illumination and is more responsive to change than a passive matrix.

In various embodiments, mobile computing device 204 may communicate information over a wireless shared media or network 202 via transceiver 228. The wireless shared media or network 202 may comprise one or more allocations of RF spectrum. The allocations of RF spectrum may be contiguous or non-contiguous. In some embodiments, the transceiver 228 may communicate information over the wireless shared media or network 202 using various multi-carrier techniques utilized by, for example, WiMAX or WiMAX II systems. For example, the transceiver 228 may utilize various techniques to perform beamforming, spatial diversity or frequency diversity.

In general operation, base station 204 may be include a processor or processor circuit 222 configured or operative to receive information from a plurality of machine-to-machine (M2M) devices over one or more wireless channels. For example, transceiver 228 may comprise a radio frequency (RF) transceiver operative to receive electromagnetic representations of the information from one or more of M2M devices 206-1-m over wireless network 202 for processing by processor 222. In various embodiments, base station 204 may comprise at least a portion of a wireless local area network (WLAN) or wireless metropolitan area network (WirelessMAN) access point (AP) or base station and may also be operative to send and receive information from non-M2M devices. Other embodiments are described and claimed.

In various embodiments, while described herein as including a processor or processor circuit 222, it should be understood that in various embodiments processor or processor circuit 222 may be operative to execute a device management module configured to perform the steps described herein. For example, device management module may comprise a software, firmware or other suitable module stored in memory 224 or any other suitable location to be executed by processor or processor circuit 222. The embodiments are not limited in this respect.

In some embodiments, the information received from the plurality of M2M devices may comprise M2M information. In various embodiments, the M2M information may comprise location information for the M2M devices, traffic characteristics of the traffic communicated to and from the M2M devices, channel information of the wireless channels used to communicate the M2M information to and from the M2M devices 206-1-$m$ to the base station 204, performance characteristics of the M2M devices or any other suitable parameter that may be communicated to base station 204.

In some embodiments, the M2M information is used by base station 204 to identify similar, related or otherwise associated M2M devices 206-1-$m$. For example, the M2M information may comprise traffic characteristics including but not limited to a traffic interval or traffic packet size. In other embodiments, the M2M information may comprise location information regarding the placement or physical location of the M2M devices, the proximity of M2M devices to other M2M devices or any other location information. In some embodiments, the M2M information may comprise network entry or network registration information that is received from one or more of the plurality of M2M devices when the M2M devices enter the network 202, 260, 262, 264. The embodiments are not limited in this respect.

In various embodiments, the processing circuit 222 may be operative to process the received information to aggregate two or more of the M2M devices as an M2M group. For example, the base station 204 may be operative to use the information received from the M2M devices 206-1-$m$ as a grouping criteria to identify M2M devices that may be grouped together as an M2M group 270. The processor circuit 222 may be operative to aggregate or group two or more M2M devices as an M2M group based on location information received from the M2M devices in some embodiments. For example, the location information may comprise proximity information for M2M devices to other M2M devices, proximity to the base station 204, location within a building or a floor of a building, or any other suitable, identifiable location.

In other embodiments, the processor circuit 222 may be operative to aggregate or group the two or more M2M devices as an M2M group 270 based on traffic characteristics received from the M2M devices. For example, the traffic characteristics may comprise one or more of a traffic interval or traffic packet size and processor circuit 222 may be operative to group M2M devices together that have similar traffic characteristics. Other embodiments are described and claimed.

The processor circuit 222 may be operative to assign a group identifier (ID) to the M2M group in some embodiments. For example, a M2M Group ID may be assigned to each of the M2M devices 206-1-$m$ selected or arranged to be part of the M2M group 270. In various embodiments, the M2M Group ID may comprise a known multicast service ID to avoid impacting current wireless standards. In some embodiments, an indicator or other identifier may be appended to or incorporated with the M2M Group ID to distinguish legacy multicast service identifiers and M2M Group identifiers.

In various embodiments, the processor circuit 222 may be operative to provide the group identifier to the M2M devices in the M2M group and to receive an acceptance acknowledgement of the group identifier from the M2M devices. For example, processor circuit 222 may send, using transceiver 228, the M2M Group ID to the M2M devices 206-1-$m$ in the M2M group 270, and may receive, via transceiver 228, a response from the M2M devices 206-1-$m$ acknowledging receipt and acceptance of the M2M Group ID and, in turn, participation in the M2M group 270.

In some embodiments, processor circuit 222 may be operative to multicast data to the M2M devices in the M2M group over the one or more wireless channels or wireless network 202. For example, the processor circuit 222 may be operative to multicast one or more of group based control signaling information or group based paging information to the M2M devices in the M2M group using network 202. In various embodiments, multiple individual messages that would otherwise be required to be sent to each of the M2M devices individually may be replaced by a group based message or messaging scheme that may reduce M2M service overhead significantly.

In various embodiments, processor circuit 222 may be operative to utilize the M2M group to efficiently provide or multicast any number, type or size of information to the M2M devices 206-1-$m$ of the M2M group 270. For example, downlink multicast data for the M2M group may be sent from the base station 204 to the M2M devices 206-1-$m$ in group M2M 270. In other embodiments, group based control signaling for the M2M group 270 may be transmitted, such as group-oriented modulation and coding schemes, power control and resource allocation mechanisms. In other embodiments, group paging may be employed for the M2M devices 206-1-$m$ of the M2M group 270.

Following acknowledgement of the M2M Group ID by the M2M devices 206-1-$m$, base station 204 may be operative to provide group-specific information to the M2M devices 206-1-$m$ of group 270, such as group based control signaling, polling paging messages, or broadcast traffic using the multicast channels. The embodiments are not limited in this respect. The foregoing will be better understood with reference to the following examples, transmission diagrams and logic diagrams.

Figure 3B:
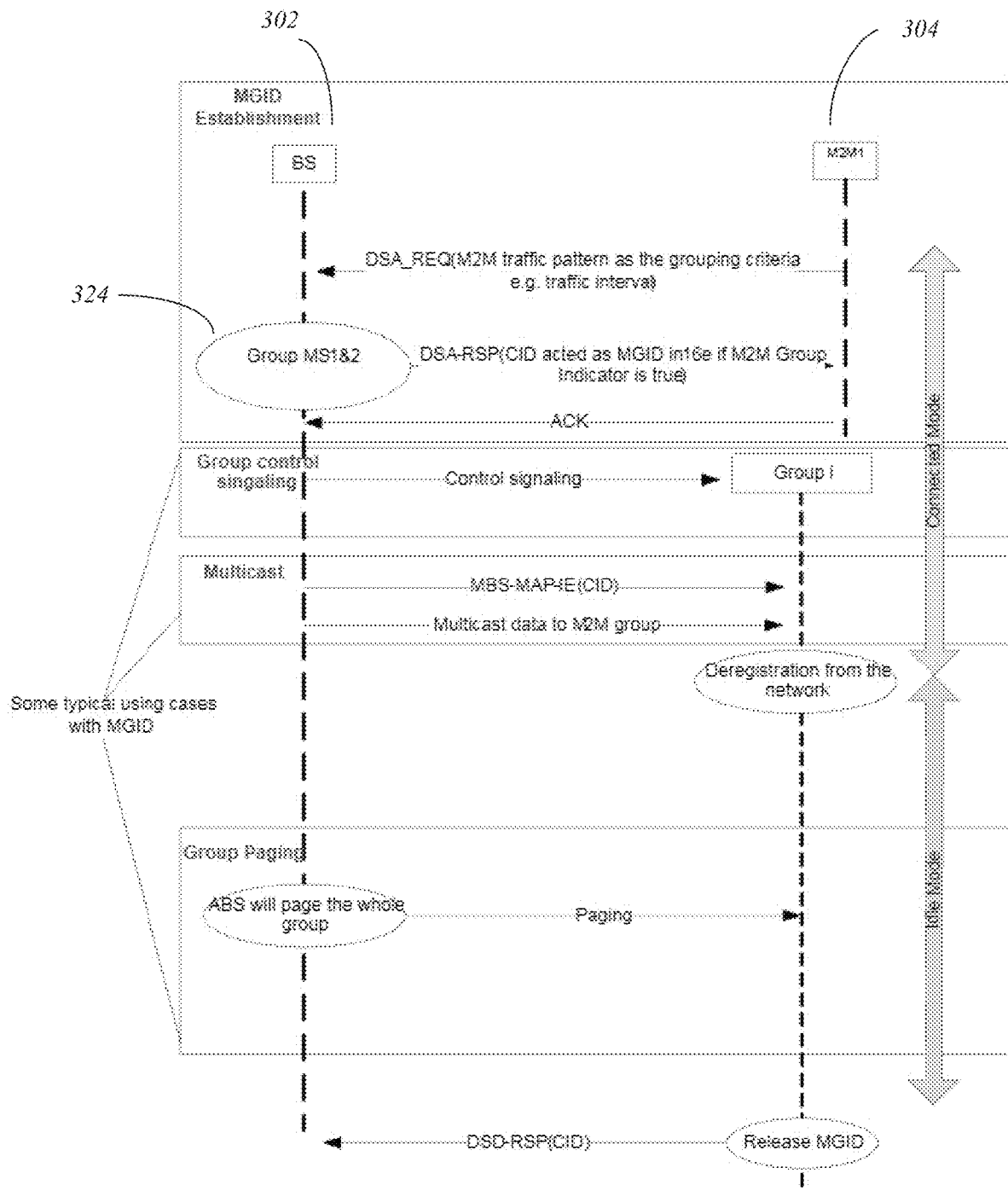
FIG. 3B illustrates one embodiment of a second transmission diagram.
Figure 3C:
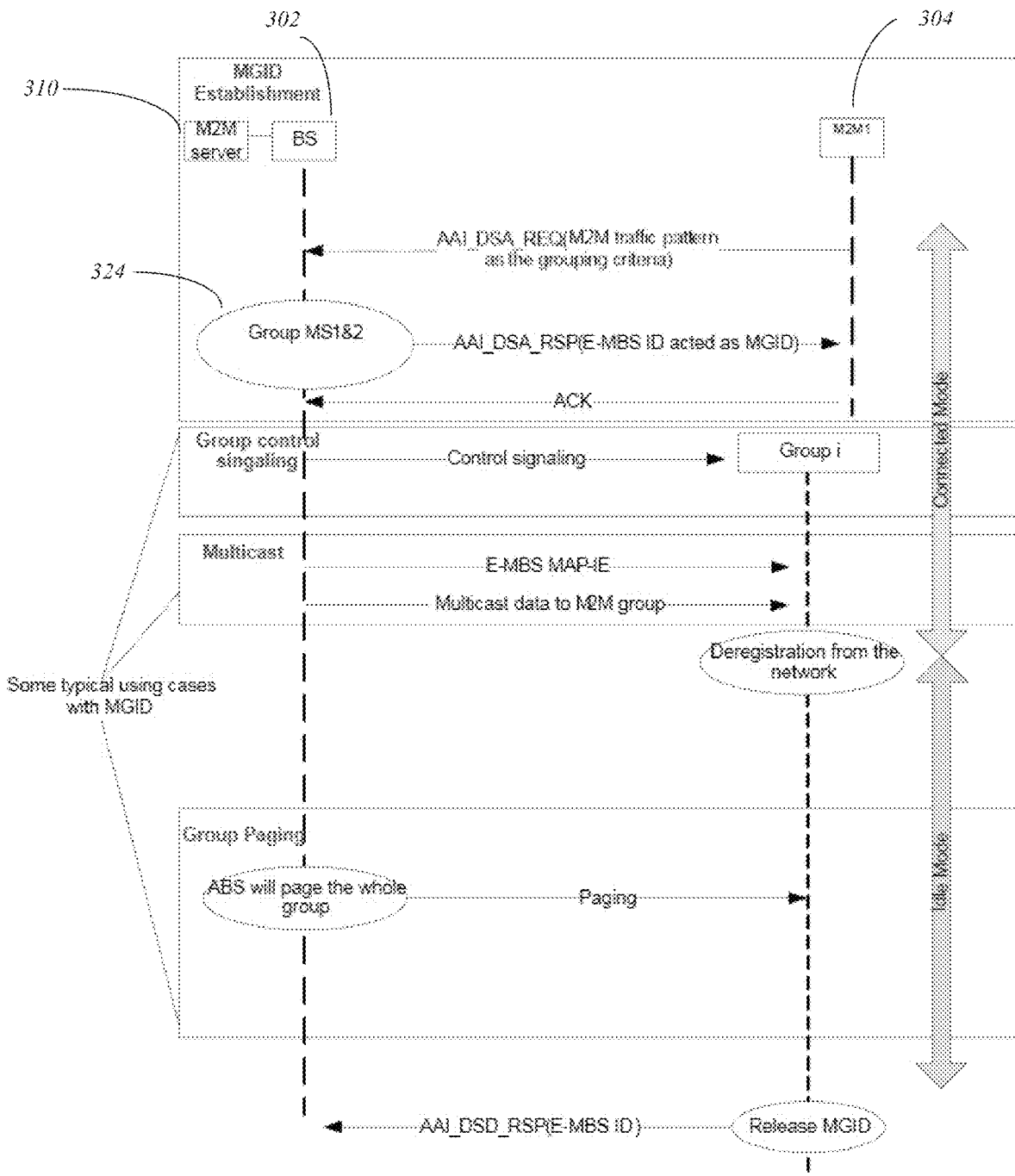
FIG. 3C illustrates one embodiment of a third transmission diagram.

FIGS. 3A, 3B and 3C illustrates example transmission diagrams for wireless networks, such as wireless networks 102 and 202, in some embodiments. Wireless networks 102 and 202 may represent, in some embodiments, wireless networks implementing a WiMAX wireless network which may include, in some embodiments, a combination of a plurality of protocols and standards, as described above. For example, the transmission diagram of FIG. 3 may illustrate, in some embodiments, a wireless network that includes a combination of 802.16e and 802.16m base stations and mobile stations. More particularly, FIGS. 3A, 3B and 3C may illustrate a 802.16p base station 302, a first M2M device 304, a second M2M device 306 and a M2M server 310. While a limited number and type of mobile stations, devices and base stations are shown for purposes of illustrations, the embodiments are not limited in this context.

As shown in FIG. 3A, base station 302 may be operative to receive information from a plurality of machine-to-machine (M2M) devices over one or more wireless channels 320, 322. For example, information 320 may be received from M2M 304 and information 322 may be received from M2M 306. In various embodiments, as shown at 324, base station 302 may be operative to aggregate two or more of the M2M devices 304, 306 as an M2M group based on the received information and at 326 base station 302 may be operative to multicast data 326 to the M2M devices 304, 306 in the M2M group 324 over the one or more wireless channels.

FIG. 3B illustrates an example transmission diagram for a 802.16e wireless network. As shown in FIG. 3B, base station 302 may be operative to receive a dynamic service add request (DSA_REQ) from one or more M2M devices 304 and may group 324 two or more M2M devices based on the received DSA_REQ. In various embodiments, an M2M traffic patter, location information or other suitable grouping criteria may be extracted or identified from the DSA_REQ and may be used as the criteria to group the M2M devices 324. Based on the grouping 324, base station 302 may provide a dynamic service add response (DSA_RSP) to the M2M devices 304. In the DSA_RSP, the base station 302 may include a M2M group ID that may be acknowledged (ACK) by the M2M devices 304. In some embodiments, based on the grouping, base station 304 may be operative to provide control signaling to the group i, provide multicast data to the M2M group, page one or more M2M devices in the M2M group or perform other suitable group-based activities until one or more of the M2M devices deregisters from the network or the group is otherwise altered or dissolved.

FIG. 3C illustrates an example transmission diagram for a 802.16m wireless network. As shown in FIG. 3C, similar messaging and grouping operations to those shown in FIG. 3B may be performed by base station 302 and M2M devices 304. As shown in FIG. 3C, the types of messages may differ slightly because of the differing (802.16m in FIG. 3C versus 802.16e in FIG. 3B) wireless standards. However, one skilled in the art will appreciate that any version of this or any other wireless standard could be used and similar grouping operations for M2M devices could be performed and still fall within the described embodiments.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 4A:
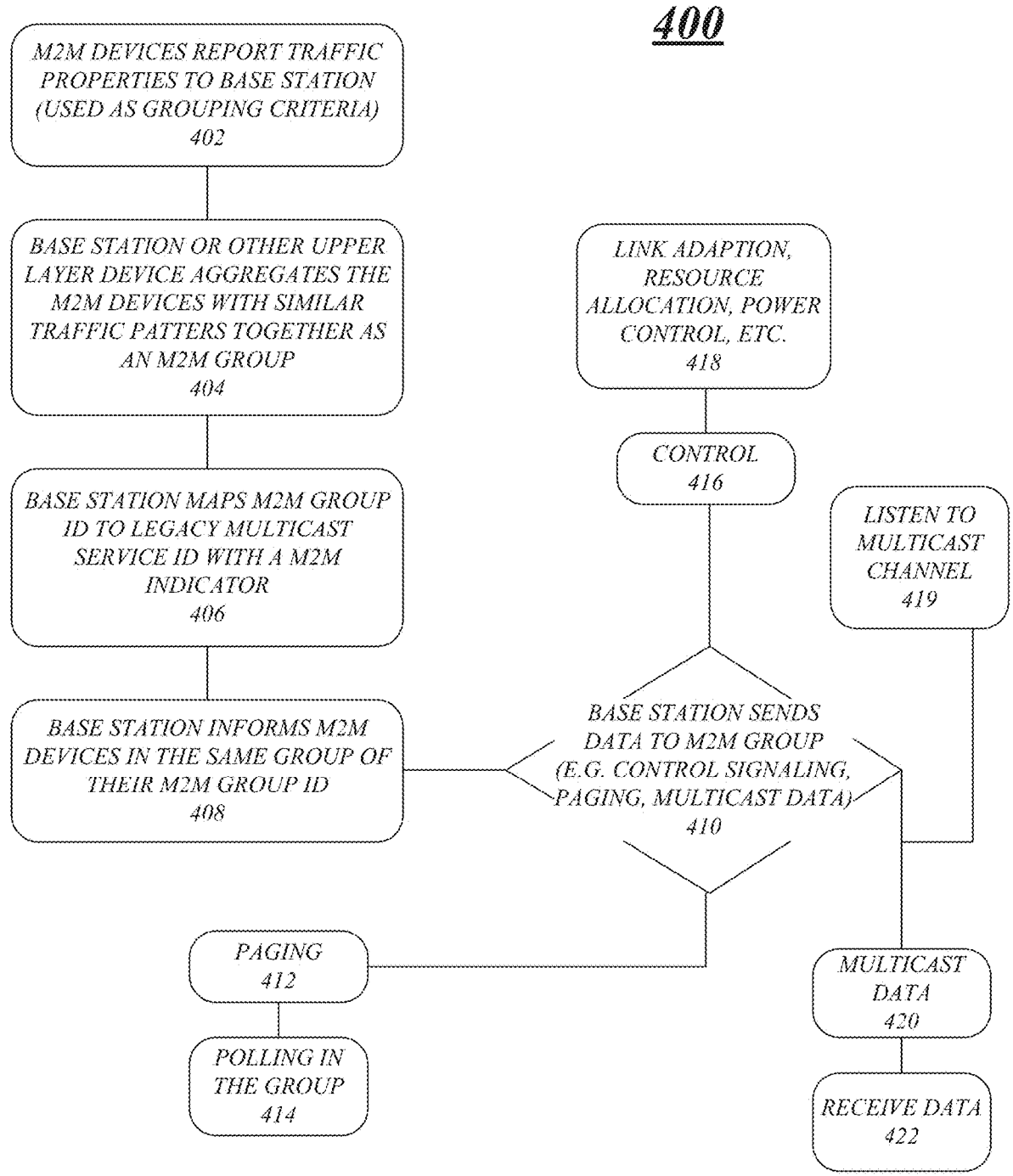
FIG. 4A illustrates one embodiment of a first logic flow.

FIGS. 4A and 4B illustrate embodiments of logic flows 400 and 450 for enabling management or grouping of M2M devices in a wireless network. In various embodiments, the logic flows 400 and 450 may be performed by various systems, nodes, and/or modules and may be implemented as hardware, software, and/or any combination thereof, as desired for a given set of design parameters or performance constraints. For example, the logic flows 400 and 450 may be implemented by a logic device (e.g., node, STA, wireless device, base station, M2M device) and/or logic comprising instructions, data, and/or code to be executed by a logic device. For purposes of illustration, and not limitation, the logic flows 400 and 450 are described with reference to FIGS. 1, 2, 3A and 3B. The embodiments are not limited in this context.

In various embodiments, as shown in FIG. 4A, a plurality of M2M devices may report traffic characteristics, location information or other suitable parameters to a base station at 402 or any other suitable device in a wireless communications system. In some embodiments, the information reported by the M2M devices may be used as grouping criteria by the base station. For example, base station 204 may receive M2M information from M2M devices 206-1-m. At 404, in some embodiments, a base station or other upper layer device may be operative to aggregate the M2M devices with similar traffic patters, locations or other suitable grouping criteria together as an M2M group. For example, base station 204 may identify M2M devices 206-1-m as having similar characteristics and may group these M2M devices as M2M group 270.

At 406, base station may be operative to map an M2M group ID to a legacy multicast service ID and may include an M2M indicator in some embodiments. For example, base station 204 may assign an M2M group ID to M2M devices 206-1-m of M2M group 270. In various embodiments, the M2M group ID may include an M2M indicator to avoid confusion with legacy multicast service IDs. In some embodiments, at 408 base station may inform the M2M devices in the M2M group of their M2M group ID. For example, base station 204 may provide the M2M group ID for M2M group 270 to M2M devices 206-1-m using one or more wireless channels of network 202.

In various embodiments, base station may send data to the M2M group at 410. For example, base station 204 may be operative to send one or more of control signaling information, paging information or multicast data to M2M devices 206-1-m of M2M group 270. At 412, the information may comprise paging information and at 414 polling may be performed in the group of M2M devices based on the paging information. At 416 the information may comprise control information and at 418 link adaptation, resource allocation, power control or other control directives may be performed based on the control information. In some embodiments, base station may be operative to listen to the multicast channel at 419 and at 420 may send multicast data to the M2M devices and the data may be received by the M2M devices at 422. Other embodiments are described and claimed.

As shown in FIG. 4B, information may be received from a plurality of M2M devices over one or more wireless channels at 452 in various embodiments. For example, base station 204 may be operative to receive M2M information from one or more M2M devices 206-1-m. In various embodiments, the information may comprise location information of the M2M devices or traffic characteristics for the M2M devices of the one or more wireless channels.

In some embodiments, two or more of the M2M devices may be grouped or aggregated as an M2M group based on the received information at 454. For example, base station 204 may form M2M group 270 based on the information received from M2M devices 206-1-m. In various embodiments, aggregating the two or more M2M devices as the M2M group may be based on the location information or the traffic characteristics.

At 456, in some embodiments, data may be multicast to the M2M devices in the M2M group over the one or more wireless channels. For example, base station 204 may be operative to multicast one or more of group based control signaling information or group based paging information to the M2M devices 206-1-m in the M2M group 270.

In various embodiments, a group identifier may be assigned to the M2M group. For example, base station 204 may assign a group ID to M2M group 270. The group identifier may comprise a multicast service identifier having an M2M indicator and may be provided to the M2M devices in the M2M group in some embodiments. For example, base station 204 may be operative to provide the M2M group ID to the M2M devices 206-1-m of M2M group 270 using network 202 in some embodiments. In various embodiments, an acceptance acknowledgement of the group identifier may be received from the M2M devices. For example, base station 204 may be operative to receive acknowledgement or acceptance of the group ID from one or more of the M2M devices 206-1-*m* of M2M group 270. The embodiments are not limited in this respect.

FIG. 5 illustrates one embodiment of an article of manufacture 500. As shown, the article 500 may comprise a storage medium 502 to store logic 504 for managing or grouping M2M devices in a wireless network in some embodiments. For example, logic 504 may be used to implement a processor circuit or grouping management module for a mobile computing device, node or other system, as well as other aspects of nodes 104-1-*n*, for example. In various embodiments, the article 500 may be implemented by various systems, nodes, and/or modules.

The article 500 and/or machine-readable or computer-readable storage medium 502 may include one or more types of computer-readable storage media capable of storing data, including volatile memory or, non-volatile memory, removable or non-removable memory, erasable or non-erasable memory, writeable or re-writeable memory, and so forth. In some embodiments, the store medium 502 may comprise a non-transitory storage medium. Examples of a machine-readable storage medium may include, without limitation, random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other type of computer-readable storage media suitable for storing information. Moreover, any media involved with downloading or transferring a computer program from a remote computer to a requesting computer carried by data signals embodied in a carrier wave or other propagation medium through a communication link (e.g., a modem, radio or network connection) is considered computer-readable storage media.

The article 500 and/or machine-readable medium 502 may store logic 504 comprising instructions, data, and/or code that, if executed by a machine, may cause the machine to perform a method and/or operations in accordance with the described embodiments. Such a machine may include, for example, any suitable processing platform, computing platform, computing device, processing device, computing system, processing system, computer, processor, or the like, and may be implemented using any suitable combination of hardware and/or software.

The logic 504 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context. When the logic 504 is implemented as software, any suitable processor and memory unit may execute the software.

Figure 6:
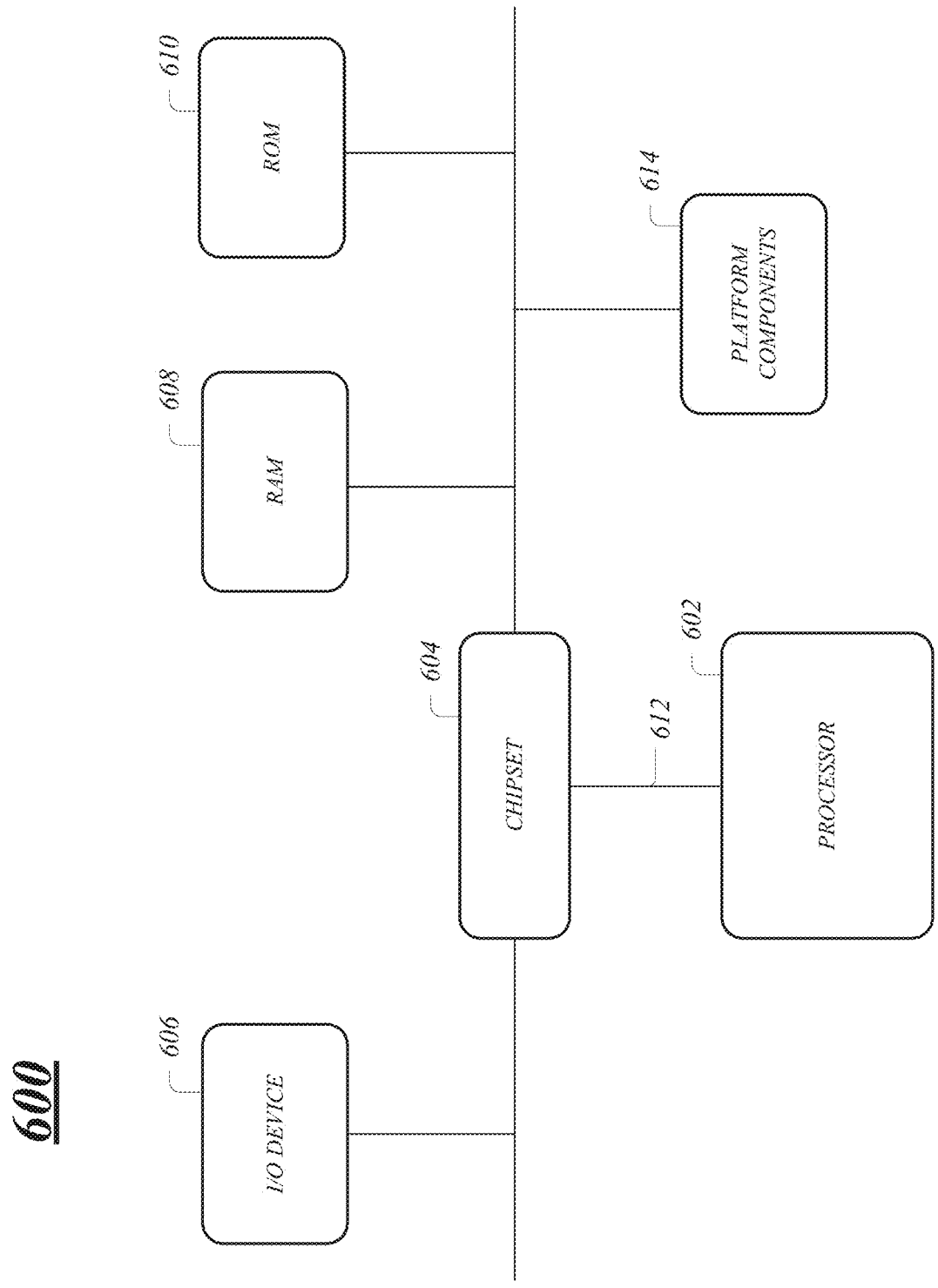
FIG. 6 illustrates one embodiment of a second apparatus.

FIG. 6 is a diagram of an exemplary system embodiment. In particular, FIG. 6 is a diagram showing a system 600, which may include various elements. For instance, FIG. 6 shows that system 600 may include a processor 602, a chipset 604, an input/output (I/O) device 606, a random access memory (RAM) (such as dynamic RAM (DRAM)) 608, and a read only memory (ROM) 610, and various platform components 614 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 6, I/O device 606, RAM 608, and ROM 610 are coupled to processor 602 by way of chipset 604. Chipset 604 may be coupled to processor 602 by a bus 612. Accordingly, bus 612 may include multiple lines.

Processor 602 may be a central processing unit comprising one or more processor cores and may include any number of processors having any number of processor cores. The processor 602 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 600 may include various interface circuits, such as an Ethernet interface and/or a Universal Serial Bus (USB) interface, and/or the like. In some exemplary embodiments, the I/O device 606 may comprise one or more input devices connected to interface circuits for entering data and commands into the system 600. For example, the input devices may include a keyboard, mouse, touch screen, track pad, track ball, isopoint, a voice recognition system, and/or the like. Similarly, the I/O device 606 may comprise one or more output devices connected to the interface circuits for outputting information to an operator. For example, the output devices may include one or more digital displays, printers, speakers, and/or other output devices, if desired. For example, one of the output devices may be a digital display. The display may be a cathode ray tube (CRTs), liquid crystal displays (LCDs), light emitting diode (LED) display or any other type of display.

The system 600 may also have a wired or wireless network interface to exchange data with other devices via a connection to a network. The network connection may be any type of network connection, such as a wireless connection or a wired connection, including but not limited to a cellular connection, radio frequency connection, an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

The foregoing represent are only a few examples of the problems that may be overcome by implementing a method, system and apparatus to manage or group M2M devices in a wireless communications system, and it may be appreciated that other problems may be overcome and other advantages may exist as well.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code, that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It is also worthy to note that any reference to "one embodiment" or "an embodiment" means that a particular feature, structure, or characteristic described in connection with the embodiment is included in at least one embodiment. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A method for communicating in a wireless network, the method comprising:
   receiving dynamic service add requests (DSA_REQs) with machine-to-machine (M2M) information from a plurality of M2M devices over one or more wireless channels in order to form a group of M2M devices in a M2M wireless communication system, the group of M2M devices comprising two or more M2M devices of the plurality of M2M devices and wherein the group of M2M devices is formed after receiving at least two of the DSA_REQs respectively from two M2M devices of the plurality of M2M devices;
   aggregating the two or more M2M devices as an M2M group based on traffic characteristics for the two or more M2M devices, the traffic characteristics described by the M2M information comprised in the DSA_REQs received from the two or more M2M devices and used as grouping criteria to identify the two or more M2M devices as devices to be grouped together as the M2M group, the traffic characteristics comprising a traffic packet size;
   assigning a group identifier to the M2M group, the group identifier comprising a multicast service identifier and an M2M indicator;
   sending dynamic service add responses (DSA_RSPs) to the M2M devices in the M2M group;
   providing the group identifier to the M2M devices in the M2M group by including the group identifier in the DSA_RSPs;
   receiving acceptance acknowledgements of the group identifier from the M2M devices in the M2M group; and
   sending multicast data to be received by each of the M2M devices in the M2M group over the one or more wireless channels.

2. The method of claim 1, comprising:
   multicasting one or more of a group based control signaling information or a group based paging information to be received by each of the M2M devices in the M2M group.

3. The method of claim 1, the plurality of M2M devices comprising one or more sensors, meters, or mobile computing devices.

4. The method of claim 1, the wireless network operative to use protocols compatible with an Institute of Electrical and Electronics Engineers (IEEE) 802.16p standard.

5. An apparatus for communicating in a wireless network, the apparatus comprising:
   a memory; and
   a processor circuit coupled to the memory, the processor circuit configured to:
   receive dynamic service add requests (DSA_REQs) with machine-to-machine (M2M) information from a plurality of M2M devices over one or more wireless channels in order to form a group of M2M devices in a M2M wireless communication system, the group of M2M devices comprising two or more M2M devices of the plurality of M2M devices and wherein the group of M2M devices is formed after receiving at least two of the DSA_REQs respectively from two M2M devices of the plurality of M2M devices;
   aggregate the two or more M2M devices as an M2M group based on traffic characteristics for the two or more M2M devices, the traffic characteristics described by the M2M information comprised in the DSA_REQs received from the two or more M2M devices and used as grouping criteria to identify the two or more M2M devices as devices to be grouped together as the M2M group, the traffic characteristics comprising a traffic packet size;
   assign a group identifier to the M2M group, the group identifier comprising a multicast service identifier and an M2M indicator;
   send dynamic service add responses (DSA_RSPs) to the M2M devices in the M2M group;
   provide the group identifier to the M2M devices in the M2M group by including the group identifier in the DSA_RSPs;
   receive acceptance acknowledgements of the group identifier from the M2M devices in the M2M group; and
   send multicast data to be received by each of the M2M devices in the M2M group over the one or more wireless channels.

6. The apparatus of claim 5, comprising:
   a radio frequency (RF) transceiver coupled to the processor circuit to send and receive electromagnetic representations of the information and the multicast data.

7. The apparatus of claim 5, the apparatus comprising at least a portion of a wireless local area network (WLAN) or wireless metropolitan area network (WirelessMAN) access point (AP).

8. The apparatus of claim 5, the wireless network operative to use protocols compatible with an Institute of Electrical and Electronics Engineers (IEEE) 802.16p standard.

9. The apparatus of claim 5, the processor circuit configured to multicast one or more of a group based control signaling information or a group based paging information to be received by each of the M2M devices in the M2M group.

10. A system for communicating in a wireless network, the system comprising:
    an antenna array;
    a transceiver coupled to the antenna array;
    a memory; and
    a processor coupled to the memory and the transceiver, the processor operative to execute a device management module configured to:
    process dynamic service add requests (DSA_REQs) with machine-to-machine (M2M) information received by the transceiver from a plurality of M2M devices over one or more wireless channels in order to form a group of M2M devices in a M2M wireless communication system, the group of M2M devices comprising two or more M2M devices of the plurality of M2M devices and wherein the group of M2M devices is formed after receiving at least two of the DSA_REQs respectively from two M2M devices of the plurality of M2M devices;
    aggregate the two or more M2M devices as an M2M group based on a network entry information or a network registration information of the two or more M2M devices, the network entry information or the network registration information described by the M2M information comprised in the DSA_REQs received from the two or more M2M devices and used as grouping criteria to identify the two or more M2M devices as devices to be grouped together as the M2M group;

assign a group identifier to the M2M group, the group identifier comprising a multicast service identifier and an M2M indicator;

send dynamic service add responses (DSA_RSPs) to the M2M devices in the M2M group;

provide the group identifier to the M2M devices in the M2M group by including the group identifier in the DSA_RSPs;

receive acceptance acknowledgements of the group identifier from the M2M devices in the M2M group; and send, via the transceiver, multicast data to be received by each of the M2M devices in the M2M group over the one or more wireless channels.

11. The system of claim 10, the processor configured to multicast via the transceiver one or more of a group based control signaling information or a group based paging information to be received by each of the M2M devices in the M2M group.

12. The system of claim 10, the system comprising at least a portion of a wireless local area network (WLAN) or wireless metropolitan area network (WirelessMAN) access point (AP).

13. The system of claim 10, the wireless network operative to use protocols compatible with an Institute of Electrical and Electronics Engineers (IEEE) 802.16p standard.

* * * * *